Dec. 18, 1951   H. R. RIPPON   2,579,205
MARKING GAUGE
Filed Oct. 29, 1949
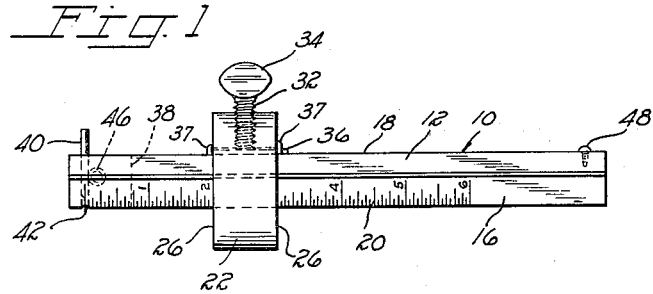
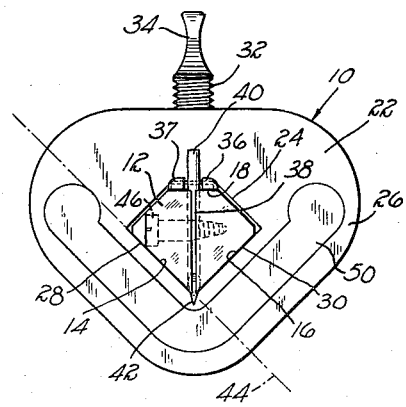
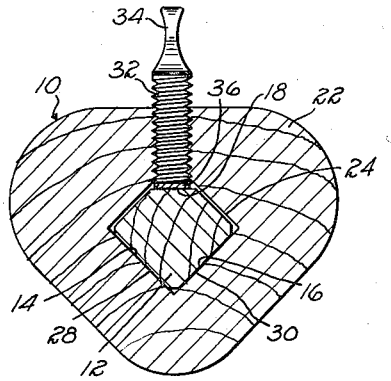
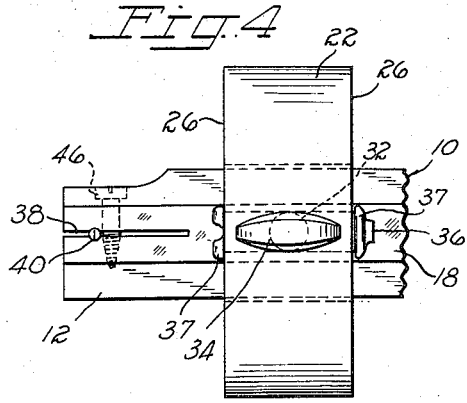
Inventor
HAROLD R. RIPPON
By
Lindsey, Prutzman + Just
Attorneys Patented Dec. 18, 1951

2,579,205

UNITED STATES PATENT OFFICE 2,579,205

MARKING GAUGE

Harold R. Rippon, East Lynn, Mass., assignor to The Stanley Works, New Britain, Conn., a corporation of Connecticut Application October 29, 1949, Serial No. 124,321

3 Claims. (Cl. 33—42)

This invention relates to improvements in a marking gage such as used in woodworking for purposes of marking a line on a piece of wood parallel to one edge thereof.

Marking gages in present use are of several types having either square or cylindrical bars which extend transversely through an opening provided in the gage block or slide of the marking gage. The bar generally slides quite freely through the opening in the gage block and, when the locking screw of the gage block is operated to clamp the block to the bar, the play normally present between the surfaces of the bar and the walls of the opening in the block frequently will permit slight movement of the block relative to the bar.

Further, the marking gages now in use have a marking point extending transversely through the bar adjacent one end thereof. In marking gages having square bars, the marking point usually extends through the bar with the marking point parallel to and spaced midway between two opposed sides of the bar. Thus, when a marking gage having either a cylindrical or square bar is used, the operating tip of the marking point is usually invisible since it projects from the surface of the bar which is sliding along and nearest to the work surface. Also, a cylindrical bar only affords a line contact with the work surface and a square bar with the tip of the marking point projecting through one of the flat surfaces midway of the edges thereof generally projects beyond the under surface of the bar to such an extent that said under surface is usually not in engagement with the working surface due to the marking point holding said surface out of engagement with the work. Thus, firm sliding engagement between such bars and the work surface is not possible.

It is an object of the invention to provide a marking gage having a bar provided with two adjoining flat surfaces disposed at an angle to each other and a gage block having a transverse opening or hole slidably receiving the bar, said opening having two adjoining flat walls disposed at an angle similar to that between the flat sides of the bar so as to be complementary to said flat surfaces of the bar, and the locking screw of the gage block so disposed therein that when it is tightened to clamp the gage block relative to the bar, which flat surfaces of the bar will be wedged into firm engagement with the adjoining flat surfaces of the opening in the gage block.

It is another object of the present invention to provide a marking gage having a bar provided with two adjoining flat surfaces disposed at an angle to each other, said flat surfaces being selectively slidable against the work surface in parallel relationship thereto, and the marking point of the gage extending through said bar transversely to the axis thereof and substantially bisecting the angle between said flat surfaces, whereby the tip of the marking point is clearly visible at all times during use regardless of which of the two flat surfaces is being slidably moved against the work surface.

Still another object of the invention is to provide a marking gage having two adjoining flat surfaces disposed at an angle to each other, said bar having a slot extending longitudinally thereof and substantially bisecting the angle between said two flat surfaces, and further providing a marking point adjustably mounted between the walls of said slot and clamping means operable to clamp the sides of the slot against the marking point so as to hold the tip of the marking point in different positions of projection beyond the adjoining edges of the two flat sides of the bar.

Details of these projections and of the invention, as well as other objects thereof, are set forth in the accompanying specification and illustrated in the accompanying drawing comprising a part thereof.

In the drawing,

Fig. 1 is a side elevation of a marking gage embodying the present invention.

Fig. 2 is a view of one end of said gage illustrated on a larger scale than that used in Fig. 1.

Fig. 3 is a sectional view of the marking gage on the same scale as Fig. 2, said section being taken along the axis of the clamping screw of the gage.

Fig. 4 is a fragmentary top plan view of the marking gage shown in Fig. 1 but illustrated on the same scale as in Figs. 2 and 3.

Referring to the drawings, the marking gage 10 comprises a stock or bar 12 which is shown in the exemplary illustration herein as being somewhat square in cross section. Two adjoining flat surfaces 14 and 16 are disposed at an angle thereto which is illustrated herein as being approximately 90° but it is to be understood that said surfaces may be disposed at other angles than 90° within the spirit of the present invention. The corner of the bar opposite the corner defined by surfaces 14 and 16 has been flattened throughout its length to provide a clamp engaging surface 18 which is transverse to a plane bisecting the angle between flat surfaces 14 and 16 of the bar. One or both of the surfaces 14 and 16 are provided with a scale 20 for use in setting the block of the marking gage as described hereinafter.

A gage slide or block 22 is provided with a substantially central opening or hole 24 which slidably receives the bar 12. The gage block 22 has opposed parallel flat faces 26 which are transverse to the axis of the bar 12. The opening or hole 24 includes two adjoining flat walls 28 and 30 which are disposed at an angle to each other, said angle being the same as that between flat surfaces 14 and 16 of the bar 12. The other walls defining the opening 24 are spaced sufficiently from the flat walls 28 and 30 to permit the bar 12 to slide freely within the opening 24.

Threaded into the gage block 22 is a locking thumb screw 32 having a finger engaging head 34 at its outer end. The axis of the screw is disposed in the plane bisecting the angle between the flat walls 28 and 30 of the opening 24. Extending through the opening 24 so as to be engaged by the inner end of the screw 32, and slidable relative to the clamp engaging surface 18 of the bar 12, is a shoe 36 having upstanding members 37 at either end which are engageable with the faces 26 of the gage block 22 for purposes of preventing removal of the shoe from the gage block 22 during normal use thereof. When the locking screw 32 is tightened, it will move the shoe 36 into engagement with the surface 18 of the bar 12 and force the flat walls 28 and 30 of the opening 24 in the gage block firmly into wedging engagement with the flat surfaces 14 and 16 of the bar 12. When so clamped in wedging relationship, no movement or wobble is possible between the gage block and bar under normal operating conditions and the faces 26 of the gage block 22 will be held firmly in accurate transverse position relative to the axis of the bar 12.

One end of the bar 12 is provided with a slot 38 which extends longitudinally inward from one end thereof as clearly shown in Fig. 4. Said slot bisects the angle between the adjoining flat surfaces 14 and 16 of the bar and receives a marking point 40 which extends transversely to the axis of the bar 12 and the sharpened marking tip 42 of the marking point 40 is projected beyond the adjoining edges of the flat surfaces 14 and 16 of the bar. When so extended, as clearly shown in Fig. 2, the tip 42 will be clearly visible while either one of the flat surfaces 14 or 16 of the bar 12 is slidably moved against the work surface 44, illustrated in dot and dash line in Fig. 2. The tip 42 is preferably projected beyond the bar 12 only a sufficient distance to form a desired depth of marking line in the work surface 44 and, when the bar 12 is moved along said work surface, the flat surface thereof which is in sliding engagement with the work surface will be fully in engagement therewith and thus provide a very steady control of the gage while being operated, regardless of which of the flat surfaces 14 or 16 is against the work surface 44.

A clamping screw 46 extends through the bar 12 and slot 38 adjacent the marking point 40 and transversely through the plane of the slot 38. Said screw, when tightened, will serve to firmly clamp the surfaces of the slot 38 against the sides of the marking point 40 to hold the tip 42 thereof in any desired degree of projection from the slot relative to the adjoining edges of the flat surfaces 14 and 16 of the bar 12.

The opposite end of the bar 12 is preferably provided with a stop screw 48 to prevent accidental removal of the gage block 42 from the bar 12. Also, the face 26 of the gage block nearest the marking point 40 may be provided with a face insert 50 formed from metal or other suitable wear resistant material for purposes of preventing undue wear of said face 26 while sliding against the side of a work piece which is being marked by the gage.

It will thus be seen that the present invention provides a rugged and durable marking gage so constructed that the tip of the marking point will be visible at all times during use while permitting the portion of the flat surface 14 or 16 of the bar of the marking gage between the marking point and gage block to be in full sliding engagement with the work surface being marked, thus providing very steady control of the marking gage during use. Further, the formation of the flat surfaces 14 and 16 of the bar and the several adjoining walls of the opening in the gage block are such that when the locking screw is tightened, said surfaces will be wedged into firm engagement with each other to prevent wobble or shifting movement of the gage block relative to the bar. Also, said improvements are made possible without increasing the cost of manufacture of the gage over the cost of present marking gages.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. A marking gage comprising in combination, a single bar having two adjoining flat gaging surfaces extending therealong at an angle to each other, said surfaces being slidable selectively against a work surface in parallel relationship thereto, a gage block having an opening transversely therethrough slidably receiving said bar and including two adjoining angularly related walls complementary to said gaging surfaces of said bar, a locking screw carried by said gage block and arranged to engage said bar oppositely of the apex of the angle between said gaging surfaces to wedge said bar against said gage block within the transverse opening when said locking screw is tightened, and a marking point carried by said bar adjacent one end thereof and extending transversely to the axis of said bar, the axis of said marking point substantially bisecting the angle between said gaging surfaces of said bar and the tip of said point extending beyond the adjoining edges of said gaging surfaces, whereby said tip is clearly visible while marking a surface against which one of said gaging surfaces is being moved.

2. A marking gage comprising in combination, a single bar having two adjoining flat gaging surfaces extending therealong at an angle to each other and said bar having at one end thereof a slot extending longitudinally of the bar and substantially bisecting the angle between said flat gaging surfaces, said flat surfaces being slidable selectively against a work surface in parallel relationship thereto, a gage block having an opening transversely therethrough slidably receiving said bar and including two adjoining angularly related walls complementary to said gaging surfaces of said bar, a locking screw carried by said gage block arranged to engage said bar oppositely of the apex of the angle between said gaging surfaces to wedge said bar against said gage block within the transverse opening when said locking screw is tightened, a marking point disposed within said slot and extending transversely to the axis of said bar, the tip of said marking point being arranged to be projected any desired distance beyond the adjoining edges of said gaging surfaces of said bar, and a clamping screw extending through said bar and slot adjacent and transversely to the axis of said marking point, said screw being operable to clamp the walls of said slot against said marking point to maintain a desired adjusted position thereof relative to said bar whereby said tip of said marking point may be projected to be clearly visible while marking a work piece to the desired depth with either of said gaging surfaces in surface-to-surface contact with the work piece.

3. A marking gage comprising in combination a bar of pentagonal cross section having two angularly related flat gaging surfaces extending therealong and having at one end a longitudinal slot substantially bisecting the angle between said gaging surfaces, a gage block having a transverse pentagonal opening therethrough slidably receiving said bar, a locking screw carried by said gage block arranged to engage said bar oppositely of the apex of the angle between said gaging surfaces to wedge said gaging surfaces against said gage block within the transverse opening when said locking screw is tightened, and a marking point adjustably disposed within said slot transversely of the axis of the bar, the tip of said marking point being arranged to be projected so as to mark a work piece to the desired depth with either of said gaging surfaces in surface-to-surface contact with the work piece.

HAROLD R. RIPPON.

REFERENCES CITED

The following references are of record in the file of this patent:

UNITED STATES PATENTS

| Number | Name | Date |
|---|---|---|
| 41,867 | Sholl | Mar. 8, 1864 |
| 334,308 | Traut | Jan. 12, 1886 |
| 379,117 | Lycett | Mar. 6, 1888 |
| 549,513 | Holmes | Nov. 12, 1895 |
| 1,598,993 | Vlazny | Sept. 7, 1926 |
| 2,017,430 | Anderson | Oct. 15, 1935 |

FOREIGN PATENTS

| Number | Country | Date |
|---|---|---|
| 209,793 | Germany | May 8, 1909 |